Oct. 20, 1959     A. M. HENKE     2,909,480
HYDROREFORMING PROCESS
Filed Jan. 18, 1956
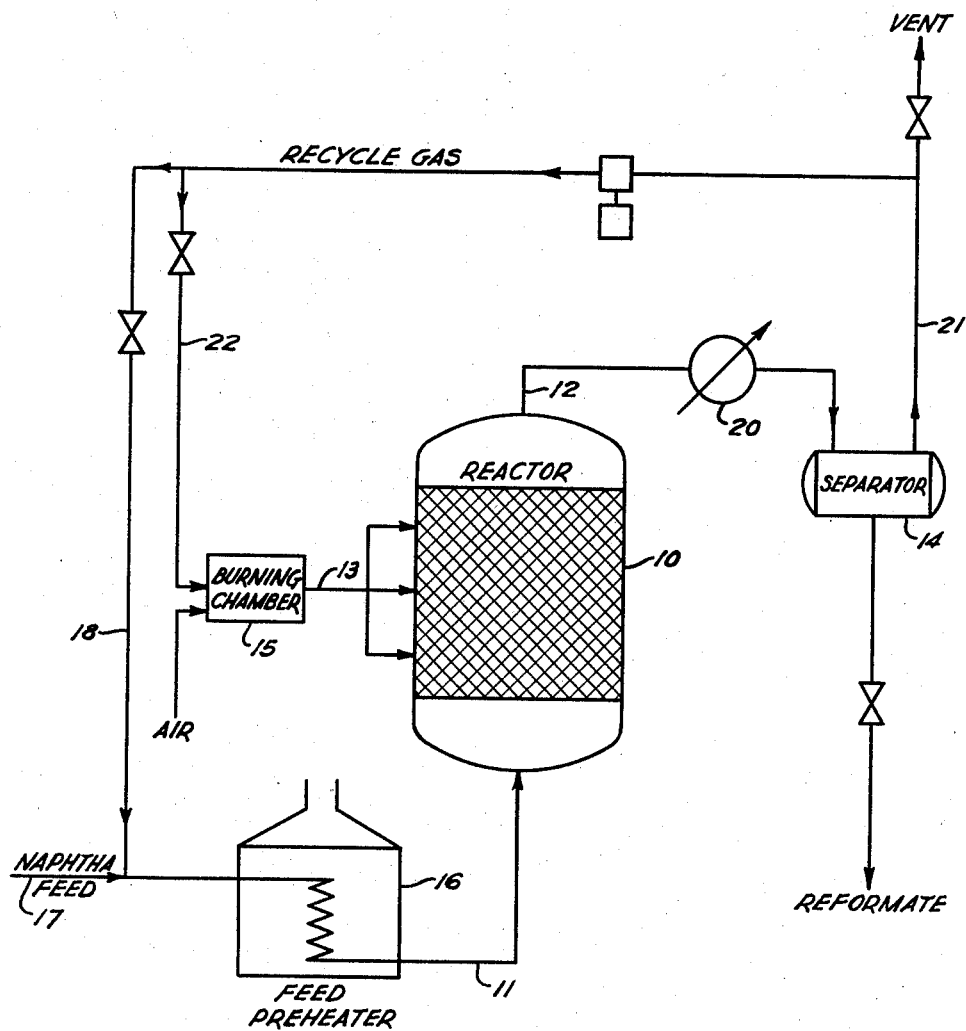
INVENTOR.
ALFRED M. HENKE
BY

United States Patent Office 2,909,480
Patented Oct. 20, 1959

2,909,480

HYDROREFORMING PROCESS

Alfred M. Henke, Springdale, Pa., assignor to Gulf Research & Development Company, Pittsburgh, Pa., a corporation of Delaware Application January 18, 1956, Serial No. 559,815

2 Claims. (Cl. 208—138)

This invention relates to the conversion of hydrocarbons and more particularly to a process for catalytically reforming hydrocarbons of the gasoline or naphtha boiling range in the presence of hydrogen.

Catalytic reforming processes are widely used for making high octane gasoline from naphthas of low octane rating. A number of different catalytic reforming processes are in use commercially but they have certain features in common. Their feed stocks are low octane gasolines or naphthas. They use a catalyst to promote the rearrangement of hydrocarbon molecules, for example, a hydrogenation-dehydrogenation type metal catalyst supported on an oxide carrier. The catalytic contact is carried out at elevated temperature, for example above 800° F. and at superatmospheric pressure in the presence of hydrogen which can be supplied by a hydrogen-containing gas recycled from the product. Since the feed is a mixture of different hydrocarbons-paraffins, naphthenes and aromatics, the reforming treatment results in a number of reactions that improve octane rating. The reactions include dehydrogenation of six-membered ring naphthenes to aromatics; isomerization of five-membered ring naphthenes (alkyl cyclopentanes) to six-membered ring naphthenes followed by dehydrogenation to aromatics; aromatization of paraffins by dehydrogenation and cyclization of straight-chain paraffins having at least 6 carbon atoms; isomerization of straight-chain paraffins to their branched-chain isomers; and hydrocracking of long-chain paraffins.

The overall reforming process is endothermic. Heat must be supplied to the reaction zone. Several methods of supplying heat are known in the prior art. In fixed bed reforming processes which use a pelleted catalyst the reaction heat is supplied solely by preheating the naphtha feed. In this procedure there is a serious danger of overheating the naphtha and causing thermal cracking which lowers the liquid yield of the process. One fixed bed reforming process, to avoid excessive feed preheating for a single reactor, uses a series of catalytic reactors and the naphtha is preheated before the first reactor and is reheated before each subsequent reactor. In the known fluidized catalyst reforming processes reaction heat is supplied by continuously withdrawing a stream of catalyst from the reactor, regenerating the catalyst by burning off carbon deposits or otherwise heating the catalyst particles and returning the heated catalyst to the reactor. The disadvantage of this procedure is that the catalyst must be heated considerably above the reaction temperature in order to have sufficient heat content to supply the reaction heat when recirculated to the reactor. The process of my invention reduces these prior art problems of supplying reaction heat to a reforming reactor. In accordance with the invention the endothermic heat of reaction is obtained without overheating the feed stock or the reforming catalyst.

The process of the invention in general comprises contacting a stream of naphtha and hydrogen with a reforming catalyst under reforming conditions of temperature and pressure, partially condensing the resulting product to separate hydrogen and normally gaseous hydrocarbons from the normally liquid hydrocarbons, recycling a portion of the gaseous fraction thus obtained to the reforming reactor, passing another portion of said gaseous fraction to a burning zone and burning said portion, and recirculating the hot gaseous combustion products to the reforming reactor.

A further understanding of the invention can be obtained from a discussion of the drawing, the sole figure of which is a flow diagram of one modification of my process.

The reforming unit shown in the drawing comprises a reactor 10 which contains a pelleted platinum-on-alumina reforming catalyst which has a feed inlet line 11, a product exit line 12 and a heating gas inlet line 13. The other principal elements include a product separator 14, a recycle gas burner 15 and feed preheater 16.

A typical operation of the unit is as follows: A straight-run naphtha reforming feed from line 17 mixes with a hydrogen stream such as hydrogen-containing recycle gas from line 18 and is heated to about 850° F. in the preheater 16. The heated feed mixture is then passed by line 11 into the fixed bed reforming reactor 10. The reaction product withdrawn by line 12 is partially condensed by the cooler 20 and the normally gaseous components are separated from the normally liquid hydrocarbons in separator 14. The gaseous fraction comprising hydrogen and light hydrocarbons is withdrawn from the separator by line 21. Line 21 is provided with a vent for releasing any build-up of excess gas and with a scrubber, not shown in the drawing, for removing $N_2$, $CO_2$, etc. from the recycle gas. A portion of the gas in line 21 is recycled to the reforming reactor via line 18. Line 18 can be provided with a light oil scrubber, not shown in the drawing, to reduce the hydrocarbon content of the gas. The other portion of the gaseous fraction is passed by line 22 to the burning chamber 15 in which the hydrogen and light hydrocarbons are mixed with air and burned. The hot combustion gas from chamber 15 is then passed by line 13 into reactor 10, preferably at several points along the length of the reactor, as shown in the drawing. This hot gas supplies the heat necessary in addition to the heat content of the reformer feed for the endothermic reforming reactions.

The combustion gas from the burning chamber 15 will contain such gases as stream, carbon dioxide and nitrogen. As has been pointed out in the patent application of J. B. McKinley and W. A. Horne, Serial No. 277,304, filed March 18, 1952, now Patent 2,864,875, a high concentration of oxygenic gases can be charged to a reforming reactor. In fact, within certain limits of concentration described in said application the oxygenic gases have a beneficial effect on the reforming reactions in addition to the function of supplying heat in accordance with my invention.

In my process the amount of combustion gas introduced into the reactor will depend on the amount of heat that is needed in addition to the heat provided by mild preheating of the naphtha charge. Even when the reforming reaction is carried out at the highest of conventional reforming temperatures, e.g., 1,000° F., enough heat can be supplied by the combustion gas in accordance with my invention without raising the concentration of oxygenic gases in the reaction zone to a level that would adversely affect the yield-octane relationship of the gasoline product. It should be kept in mind, however, that the maximum steam concentration allowable will depend to some extent on the steam stability of the catalyst being used.

The benefits of my invention can be obtained with any of the hydroreforming catalysts. These catalysts form a recognized class and they include metals of groups V, VI and VIII of the periodic table and the oxides of such metals. The more important reforming catalyst metals are platinum, chromium, molybdenum, tungsten, cobalt and nickel. While these metals or their oxides can be used alone, it is the usual practice to employ catalysts which comprise one or more of the metals or metal oxides deposited on a support such as alumina, silica-alumina composites, activated clays and the like.

My process has its greatest advantages when used with catalysts that are subject to damage by excessive temperatures and when this type of catalyst is used at high reforming temperatures, e.g., 950° to 1000° F. A catalyst which can be damaged by excessive heating is the platinum-on-alumina catalyst which consists of from 0.1 to 1.0 percent platinum composited with alumina that contains a small amount of chlorine and/or fluorine. This is a valuable catalyst for hydro-reforming and related processes. It can have its activity severely reduced by being subjected to excessive temperatures such as temperatures above 1000° F. The temperature that the catalyst can stand without injury will depend somewhat on the length of time that it is kept at the high temperature. For example, heating the catalyst in air for several hours at a temperature even as low as 900° F. can injure a platinum-alumina catalyst by sintering the catalyst and reducing its surface area. A sensitive catalyst of this type can be used in my process without subjecting it to such high temperatures and without the need for resorting to such expedients as the use of a plurality of reactors with feed heaters between each reactor to avoid excessive temperatures in any one reactor.

In the drawing I have shown a reactor in which the reforming catalyst in pelleted or granular form is deposited in a stationary fixed bed. However, my process may also be carried out with a finely divided catalyst maintained in a fluidized state. My process is particularly advantageous for use in the fixed fluid bed type of reaction since it can eliminate the need for withdrawing a stream of catalyst merely for heating purposes.

The reaction conditions in my process are substantially in the range of the conventional conditions for catalytic reforming although it may be desirable for the temperature of the reaction to be from 25° to 50° F. higher than would be used with otherwise identical conditions in a reforming operation carried out without adding oxygenic gases to the reactor. When I use the term "reforming conditions" in the specification and claims I refer in general to the conventional reforming conditions which include a temperature from 800° to 1100° F., a pressure from 100 to 1,000 pounds per square inch gauge, a hydrogen concentration from 500 to 20,000 standard cubic feet per barrel of naphtha charge and a charge space velocity from 0.25 to 10 liquid volumes of naphtha per volume of catalyst per hour. As I have mentioned, my process is most advantageous when applied to high temperature reforming, e.g. using a reaction temperature from 950° to 1100° F., because it eliminates the need for heating the catalyst to an even higher temperature to supply reaction heat.

The process of my invention can apply to the reforming of a full range gasoline feed stock or to any of the separate endothermic reactions that take place in naphtha reforming. In the specification and claims I use the term "reforming process" in its broad sense to include any of the processes similar to hydroreforming, such as hydroisomerization, hydroaromatization, etc., which treat gasoline range hydrocarbons under reforming conditions.

*Example*

In order that the invention may be understood more fully, the following specific example will be described. This example is concerned with the hydro-reforming of a Mid-Continent straight-run naphtha which is about 10 percent aromatic, about 40 percent paraffinic and about 50 percent naphthenic and has a boiling range from 250° to 400° F. The naphtha is contacted with a fixed bed, pelleted platinum-alumina catalyst under reforming conditions including a reaction temperature of 1000° F., a pressure of 500 pounds per square inch gauge, a liquid hourly space velocity of 1.0 volume of naphtha per volume of catalyst per hour. The naphtha charge mixed with hydrogen-containing recycle gas in the amount of 10,000 standard cubic feet per barrel of naphtha is preheated to 850° F. before being introduced into the catalytic reactor. The endothermic heat of reaction for the naphtha is 196 B.t.u. per pound. The heat required to raise the temperature of one barrel of naphtha from 850° F. to the reaction temperature of 1000° F. is 25,500 B.t.u. The heat required to raise 10,000 s.c.f. of recycle gas (90 volume percent $H_2$, 3 percent $CH_4$, 3 percent $C_2H_6$ and 4 percent $C_3H_8$) from 850° to 1000° F. is 36,900 B.t.u. The heat of reaction per barrel of naphtha is 52,600 B.t.u. Thus, the total heat consumed in the reforming zone is 115,000 B.t.u. per barrel of naphtha. One pound mol of the recycle gas yields 139,710 B.t.u on complete combustion. To supply the heat needed in the reforming zone 0.824 pound mol of recycle gas or 230 standard cubic feet must be burned per barrel of naphtha. The resulting combustion gas will contain about 375 s.c.f. of steam per barrel of naphtha. The concentration of steam or its equivalent in the reaction zone is about 4.5 mol percent based on the hydrogen-containing gas. (In this estimate one mol of $CO_2$ is considered the equivalent of 2 mols of steam.)

The above example demonstrates that, even when using the highest range of conventional reforming temperatures, e.g., 1000° F., it is possible by my process to supply sufficient heat with hot flue gas obtained by burning recycle gas without introducing an undesirably high concentration of oxygenic gas into the reactor. In the example the concentration of steam and carbon dioxide was equivalent to a steam concentration of only about 4.5 percent based on the hydrogen. This is well below the oxygenic gas concentration that is undesirable as disclosed in the McKinley and Horne patent application referred to above.

The figures of the example are based on introduction of pure oxygen into the burning zone. My process can use air instead of pure oxygen for burning the recycle gas. In this case, somewhat more heat would have to be evolved in the burning zone in order to heat the inert nitrogen as well as the combustion products to a temperature sufficiently above the reaction temperature to supply the heat of reaction.

As an estimate, the amount of recycle gas to be burned and the amount of hot combustion gas to introduce into the reactor can be determined by standard calculations of thermo-chemistry for obtaining heat balances of combustion processes. The general procedure is to calculate how much heat will be consumed in the reaction zone in raising the naphtha and hydrogen from preheater temperature to reaction temperature and how much will be consumed in the endothermic reforming reactions. The total of the heat that will be consumed is the amount of heat that must be evolved by burning of recycle gas. How much recycle gas that must be burned to evolve this amount of heat can then be calculated by a heat balance of the burning stage. These calculations can be used as a guide. In practice, however, corrections will have to be made because of heat loss through imperfect thermal insulation and incomplete burning of the recycle gas. A correct heat balance is obtained by using the calculated figures as a guide at the start of the process and then adjusting the conditions during operation as necessary to maintain the reforming reactor at the reforming temperature.

Obviously many modifications and variations of the invention as hereinbefore set forth may be made without departing from the spirit and scope thereof and therefore

I claim:

1. A process for the catalytic reforming of naphtha range hydrocarbons which comprises preheating said hydrocarbons to a temperature substantially below the thermal cracking temperature thereof, contacting said heated hydrocarbons in admixture with hydrogen with a platinum-alumina reforming catalyst maintained in a fixed-bed reforming zone under reforming conditions of temperature and pressure, including a temperature above 900° F., said temperature being substantially above the temperature to which said hydrocarbons are preheated, separating a hydrogen-rich gas from the reforming product, recycling a portion of said gas to said reforming zone, burning another portion of said gas and introducing the resulting hot combustion gas directly into the reforming zone separately from said naphtha in an amount and at a temperature sufficient to maintain said reforming zone at said reforming temperature above 900° F.

2. The process according to claim 1 in which said hot combustion gas in introduced into a stationary bed of platinum-alumina catalyst in said reforming zone at a plurality of points along the path of flow of hydrocarbons through said bed of catalyst.

References Cited in the file of this patent

UNITED STATES PATENTS

| | | |
|---|---|---|
| 2,284,603 | Belchetz et al. | May 26, 1942 |
| 2,301,044 | Heard et al. | Nov. 3, 1942 |
| 2,443,402 | Schulze | June 15, 1948 |
| 2,471,228 | Mathy | May 24, 1949 |
| 2,643,214 | Hartwig | June 23, 1953 |
| 2,710,827 | Gornowski | June 14, 1955 |
| 2,723,300 | Lewis | Nov. 8, 1955 |
| 2,765,264 | Pasik | Oct. 2, 1956 |

UNITED STATES PATENT OFFICE
CERTIFICATE OF CORRECTION

October 20, 1959

Patent No. 2,909,480

Alfred M. Henke

It is hereby certified that error appears in the printed specification of the above numbered patent requiring correction and that the said Letters Patent should read as corrected below.

Column 2, line 47, for "stream" read -- steam --; column 6, line 4, for "gas in" read -- gas is --.

Signed and sealed this 29th day of March 1960.

(SEAL)
Attest:

KARL H. AXLINE
Attesting Officer

ROBERT C. WATSON
Commissioner of Patents